(12) United States Patent
Kim

(10) Patent No.: US 11,769,490 B2
(45) Date of Patent: Sep. 26, 2023

(54) ELECTRONIC APPARATUS AND CONTROL METHOD THEREOF

(71) Applicant: SAMSUNG ELECTRONICS CO., LTD., Suwon-si (KR)

(72) Inventor: Sangmin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 17/077,184

(22) Filed: Oct. 22, 2020

(65) Prior Publication Data

US 2021/0158800 A1  May 27, 2021

(30) Foreign Application Priority Data

Nov. 26, 2019 (KR) .................. 10-2019-0152987

(51) Int. Cl.
*G10L 15/08* (2006.01)
*G06F 9/451* (2018.01)
*G06F 3/0484* (2022.01)
*G06F 3/16* (2006.01)

(52) U.S. Cl.
CPC .......... *G10L 15/08* (2013.01); *G06F 3/0484* (2013.01); *G06F 3/16* (2013.01); *G06F 9/453* (2018.02); *G10L 2015/088* (2013.01)

(58) Field of Classification Search
CPC ... G10L 15/08; G10L 2015/088; G06F 9/453; G06F 3/0484; G06F 3/16
See application file for complete search history.

(56) References Cited

U.S. PATENT DOCUMENTS

| | | | |
|---|---|---|---|
| 7,822,603 B1* | 10/2010 | Parthasarathy | G10L 15/07 379/88.16 |
| 10,573,321 B1* | 2/2020 | Smith | H04R 29/004 |
| 10,636,425 B2* | 4/2020 | Naughton | G06F 3/167 |
| 10,706,852 B2* | 7/2020 | Kumar | G10L 15/30 |
| 10,762,890 B1* | 9/2020 | McMahon | G06F 3/04817 |
| 2009/0271293 A1* | 10/2009 | Parkhurst | G06Q 30/02 705/26.1 |
| 2013/0289996 A1* | 10/2013 | Fry | G10L 15/32 704/E15.018 |

(Continued)

FOREIGN PATENT DOCUMENTS

KR  10-2018-0115628  10/2018

OTHER PUBLICATIONS

European Search Report and Written Opinion dated Mar. 19, 2021 in corresponding Application No. 20202808.0.

(Continued)

*Primary Examiner* — Tadesse Hailu
(74) *Attorney, Agent, or Firm* — Nixon & Vanderhye P.C.

(57) ABSTRACT

Disclosed is an electronic apparatus including: a voice input interface comprising interface circuitry configured to receive an utterance; and a processor configured to: obtain keywords of the utterance received through the voice input interface, identify a voice assistant having a degree of association greater than a threshold degree of association with the obtained keywords among the plurality of voice assistants based on predefined information on a degree of association between a plurality of voice assistants and a plurality of keywords, and perform voice recognition on the utterance based on the identified voice assistant.

20 Claims, 13 Drawing Sheets

(56) References Cited

U.S. PATENT DOCUMENTS

| | | | |
|---|---|---|---|
| 2015/0262581 A1* | 9/2015 | Aleksic | G10L 15/01 704/235 |
| 2018/0096675 A1 | 4/2018 | Nygaard et al. | |
| 2018/0157721 A1* | 6/2018 | Khaitan | G06F 16/3322 |
| 2018/0293484 A1 | 10/2018 | Wang et al. | |
| 2019/0013019 A1 | 1/2019 | Lawrence | |
| 2019/0035398 A1* | 1/2019 | Choi | G10L 15/30 |
| 2019/0318759 A1* | 10/2019 | Doshi | G10L 15/04 |
| 2019/0371312 A1* | 12/2019 | Naughton | G10L 15/22 |
| 2020/0051560 A1* | 2/2020 | Yi | G10L 15/1815 |
| 2020/0075018 A1* | 3/2020 | Chen | G10L 15/32 |
| 2020/0372907 A1* | 11/2020 | Trufinescu | G06F 9/453 |
| 2021/0037067 A1* | 2/2021 | Lee | G06F 3/167 |
| 2021/0090555 A1* | 3/2021 | Mahmood | G10L 15/1815 |

OTHER PUBLICATIONS

European Office Action dated Dec. 8, 2022 for EP Application No. 20202808.0.

* cited by examiner

FIG. 4

|  | TODAY | WEATHER | RECOMMENDATION | BROADCASTING | ... |
|---|---|---|---|---|---|
| FIRST ASSISTANT | 10 | 30 | 50 | 10 | ... |
| SECOND ASSISTANT | 20 | 10 | 30 | 50 | ... |
| ... | ... | ... | ... | ... | ... |

400

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0152987, filed on Nov. 26, 2020, the disclosure of which is incorporated by reference herein in its entirety.

BACKGROUND

1. Field

The disclosure relates to an electronic apparatus capable of capturing user utterance to execute an operation according to an instruction of the utterance, and a control method thereof, and for example, to an electronic apparatus related to execution of voice assistant for processing user utterance and a control method thereof.

2. Discussion of Related Art

In order to compute and process predetermined information according to a specific process, an electronic apparatus including electronic components such as a CPU, a chipset, and a memory for computation may be classified into various types depending on what information is to be processed or what its purpose is. For example, the electronic apparatus may include an information processing apparatus such as a PC or a server that processes general-purpose information, an image processing apparatus that processes image data, an audio apparatus that processes audio, a household appliance that performs household chores, and the like. The image processing apparatus may be implemented as a display apparatus that displays processed image data as an image on a display panel provided therein.

The electronic apparatus may receive a user input and perform a predetermined operation according to an instruction of a command corresponding to the received user input. A user input method varies according to a type of interfaces. For example, the electronic apparatus may receive a control signal according to user manipulation from a button or a remote controller, detect a user's gesture through a camera, perform eye-tracking through a camera, or receive a voice signal according to user utterance through a microphone. For example, the electronic apparatus may obtain a command according to a result of voice recognition processing of the user utterance and perform an operation instructed by the obtained command. Among voice processing methods that the electronic apparatus may use, voice assistant may be used. The voice assistant is provided to convert the user utterance into text, analyze the converted text based on deep learning, and perform an operation according to the analyzed content. In this way, the voice assistant is an artificial intelligence-based assistant service that provides more advanced and improved interpretation and analysis results of utterance, beyond simply recognizing the user utterance to identify commands.

The electronic apparatus may include a plurality of voice assistants according to a design method, and may be configured to process user utterance using any one of these voice assistants. For example, when the user utterance is input through a microphone, the electronic apparatus checks whether the user utterance includes a trigger word. A trigger word is a predefined word to identify the voice assistant, and is usually guided by a user to utter before the instruction. When the voice assistant is identified according to the trigger word, the electronic apparatus causes the identified voice assistant to process the user utterance.

However, since it is inconvenient for the user to additionally speak the trigger word, there may be cases where the user utters only the instruction without uttering the trigger word. Each voice assistant may be optimized for a specific instruction according to a design method, and there may be a voice assistant suitable for processing the corresponding uttered instruction than the voice assistant designated by the user through the trigger word. In consideration of these matters, an electronic apparatus capable of providing a voice assistant suitable for processing user utterance without additional input from a user may be required.

SUMMARY

An electronic apparatus according to an example embodiment includes: a voice input interface comprising interface circuitry configured to receive an utterance; a processor configured to: obtain keywords of the utterance received through the voice input interface, identify a voice assistant having a degree of association greater than a threshold degree of association with the obtained keywords among the plurality of voice assistants based on predefined information on a degree of association between a plurality of voice assistants and a plurality of keywords, and perform voice recognition on the user utterance based on the identified voice assistant.

The processor may identify the degree of association of each of the voice assistants defined in the information for the obtained keyword and select an identified voice assistant having a highest degree of association.

The processor may sum the degrees of association of the voice assistants for the plurality of obtained keywords and compare the summed degree of association for the plurality of voice assistants, based on the number of obtained keywords being plural.

The predefined information may be provided based on a use history of the electronic apparatus.

The use history may include information obtained by counting a processing history of each of the plurality of voice assistants for a predetermined keyword of the utterance.

The processor may adjust the degree of association of the identified voice assistant for the obtained keyword.

The processor may identify satisfaction with a result of the performed voice recognition, and increase and decrease the degree of association of the identified voice assistant based on the identified satisfaction.

The processor may add a first adjustment value to the degree of association based on an identification that the satisfaction is relatively high, and add a second adjustment value less than the first adjustment value to the degree of association based on an identification that the satisfaction is relatively low to adjust the degree of association.

The predefined information may include information obtained based on a plurality of other utterances.

The processor may display a UI configured to guide the identified voice assistant based on an identification that an amount of data of the predefined information is not greater than a threshold, and perform the voice recognition on the utterance in response to a selection of the identified voice assistant through the UI.

The processor may display a UI configured to guide a result of the voice recognition by each of the plurality of voice assistants based on an identification that an amount of data of the predefined information is not greater than a threshold, and perform the result on any one of the voice assistants selected through the UI.

A method of controlling an electronic apparatus according to an example embodiment, includes: receiving an utterance; obtaining keywords of the received utterance; identifying a voice assistant having a degree of association greater than a threshold degree of association with the obtained keywords among the plurality of voice assistants based on predefined information on a degree of association between a plurality of voice assistants and a plurality of keywords; and performing voice recognition on the utterance based on the identified voice assistant.

BRIEF DESCRIPTION OF THE DRAWINGS

The above and other aspects, features, and advantages of certain embodiments of the present disclosure will be more apparent from the following detailed description, taken in conjunction with the accompanying drawings.

FIG. 4 is a diagram of a table provided to be referenced by the electronic apparatus according to various embodiments;

DETAILED DESCRIPTION

Hereinafter, various example embodiments according to the disclosure will be described in greater detail with reference to the accompanying drawings. Embodiments described with reference to each drawing are not mutually exclusive configurations unless otherwise specified, and a plurality of embodiments may be selectively combined and implemented in one apparatus. The combination of the plurality of embodiments may be arbitrarily selected and applied by a person skilled in the art of the disclosure in implementing the spirit of the disclosure.

If there are terms including an ordinal number such as a first component, a second component, and the like in embodiments, these terms are used to describe various components, and the terms are used to distinguish one component from other components, and the components are not limited by these terms. Terms used in the embodiments are applied to describe the embodiments, and do not limit the spirit of the disclosure.

In addition, in the case where the expression "at least one" among a plurality of components is described in the present disclosure, this expression refers to not only the whole of a plurality of components, but each one excluding the rest of the plurality of components or all combinations of thereof.

Figure 1:
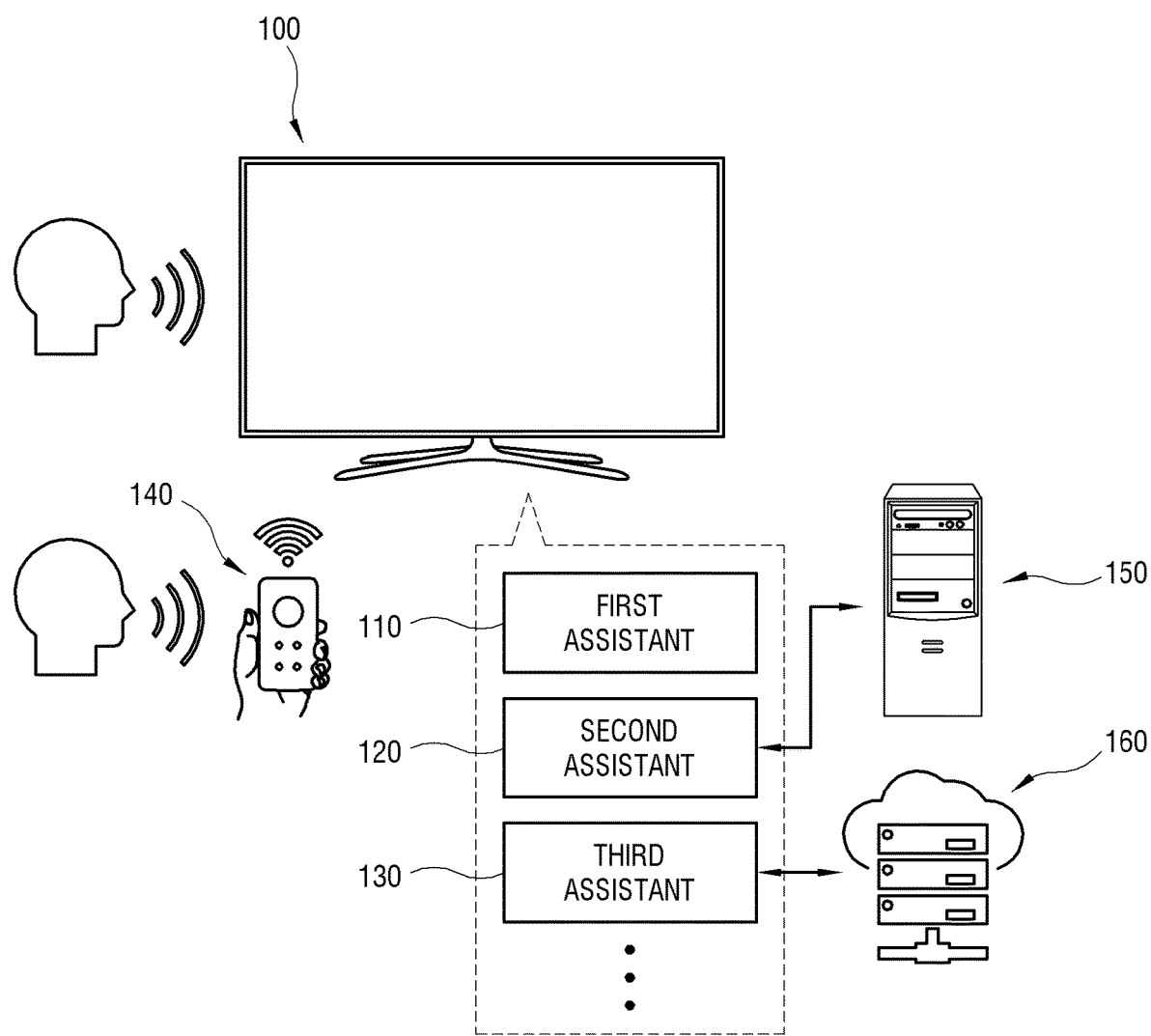
FIG. 1 is a diagram illustrating an example environment in which an electronic apparatus includes a plurality of voice assistants according to various embodiments.

FIG. 1 is a diagram illustrating an example environment in which an electronic apparatus includes a plurality of voice assistants according to various embodiments.

As illustrated in FIG. 1, an electronic apparatus 100 according to an embodiment of the disclosure may, for example, be implemented as a display apparatus capable of displaying an image. When the electronic apparatus 100 is implemented as the display apparatus, the electronic apparatus 100 may include, for example, and without limitation, a TV, a computer, a tablet, a portable media player, a wearable device, a video wall, an electronic frame, and the like. However, in reality, the electronic apparatus 100 may be implemented as various types of apparatuses such as, for example, and without limitation, a display apparatus, an image processing apparatus such as a set-top box without a display, a household appliance such as a refrigerator or a washing machine, an information processing apparatus such as a computer body, etc. In addition, the electronic apparatus 100 may be an apparatus that is installed and used at a fixed location, or a mobile device that a user may carry and use while moving.

The electronic apparatus 100 may receive an utterance, e.g., a user's voice. Then the user utters a predetermined instruction, the electronic apparatus 100 obtains a voice signal according to the utterance. In order to obtain the voice signal according to the utterance, the electronic apparatus 100 may include a microphone that collects the utterance, or may receive a voice signal from a remote controller 140 having the microphone or a separate external device.

The electronic apparatus 100 may include a plurality of voice assistants 110, 120 and 130. The voice assistants 110, 120, and 130 may, for example, include application services that determine the intention of the utterance through analysis of the content and context of the user utterance based, for example, on artificial intelligence, and perform an operation corresponding to the determination result. For example, the voice assistants 110, 120, and 130 may derive text data by performing speech to text (STT) processing on the voice signal of the user utterance input to the electronic apparatus 100, determine meaning of the text data by performing semantic analysis on the derived text data based on deep learning or machine learning, and provide a service fitted for the determined meaning.

The voice assistants 110, 120, and 130 may, for example, be an on-device-level voice assistant 110 in which most operations are performed inside the electronic apparatus 100, or may be included on servers 150 and 160 that communicate with the electronic apparatus 100 or voice assistants 120 and 130 that perform an operation in connection with an external device.

The voice assistants 120 and 130 in the case of operating in connection with the servers 150 and 160 may operate as follows, for example. When the user utterance is input to the electronic apparatus 100, the voice assistants 120 and 130 transmit the voice signal of the user utterance to the servers 150 and 160. The servers 150 and 160 perform the STT processing and semantic analysis on the received voice signal, and transmit the analyzed result to the voice assistants 120 and 130. The voice assistants 120 and 130 perform an operation corresponding to the analyzed result.

When the user utterance is input, the electronic apparatus 100 may select any one of the plurality of voice assistants 110, 120, and 130 according, for example, to a preset condition. The preset conditions may be various according to the design method of the electronic apparatus 100, and for example, the voice assistants 110, 120, and 130 may be selected based on a trigger word input together with the user utterance. The trigger word may include, for example, a predefined word to identify each voice assistant 110, 120, and 130. The electronic apparatus 100 may perform the STT processing on the voice signal in advance in order to identify the trigger word in the voice signal of the user utterance.

However, the electronic apparatus 100 according to an embodiment may cope with the case where the user utterance does not include the trigger word, and may recommend the voice assistants 110, 120, and 130 that are more suitable for the user utterance. For this operation, the electronic apparatus 100 may automatically select the voice assistants 110, 120, and 130 in response to the preset conditions separate from the trigger word, and this will be described in greater detail below.

Figure 2:
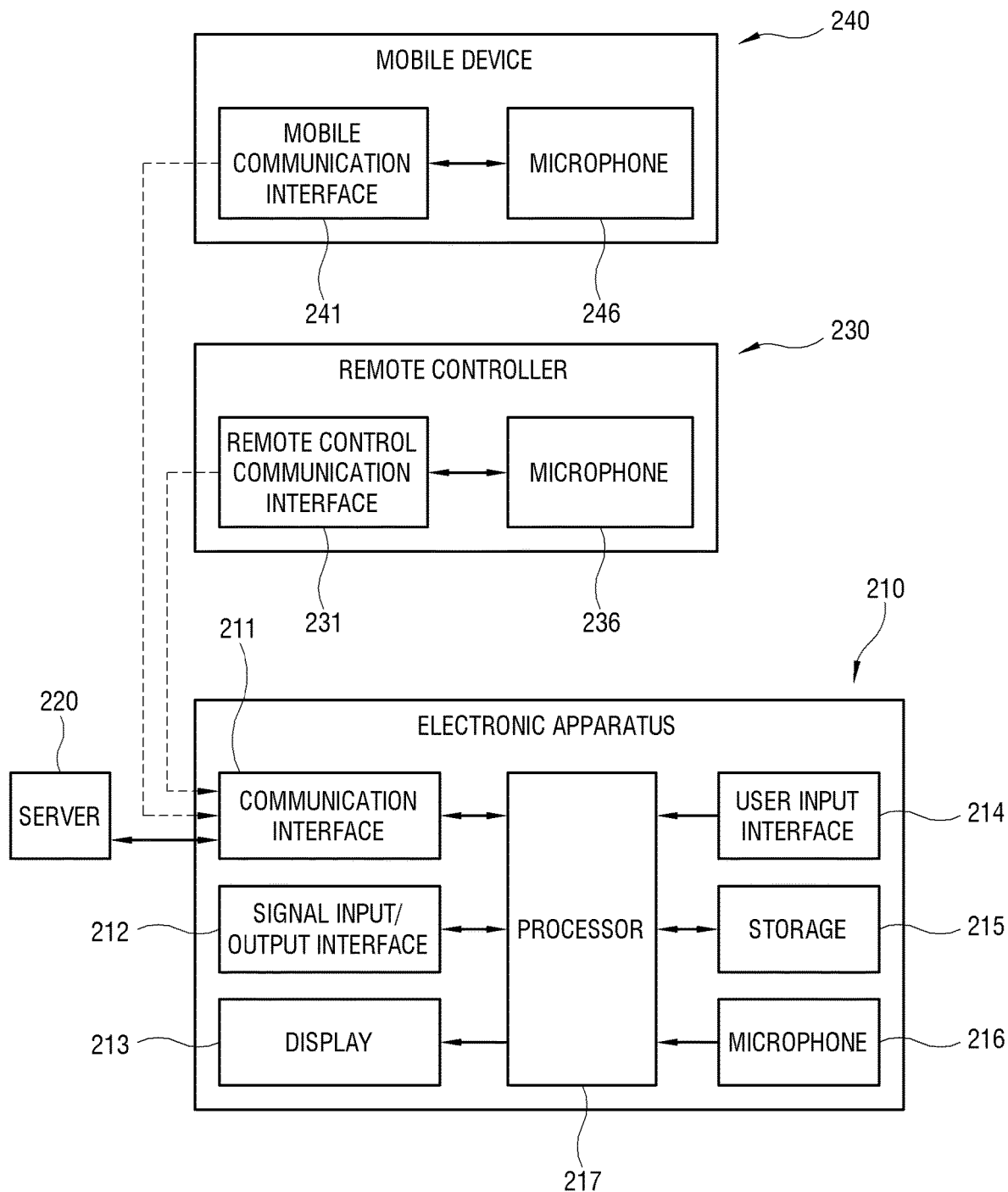
FIG. 2 is a block diagram illustrating an example configuration the electronic apparatus according to various embodiments.

FIG. 2 is a block diagram illustrating an example configuration of the electronic apparatus according to various embodiments.

As illustrated in FIG. 2, an electronic apparatus 210 may include a communication interface (e.g., including communication circuitry) 211, a signal input/output interface (e.g., including input/output circuitry) 212, a display 213, a user input interface (e.g., including interface circuitry) 214, a storage 215, a microphone 216, and a processor (e.g., including processing circuitry) 217.

Hereinafter, a configuration of the electronic apparatus 210 will be described. Although the present embodiment describes an example in which the electronic apparatus 210 is a TV, the electronic apparatus 210 may be implemented as various types of apparatuses, and therefore the present embodiment does not limit the configuration of the electronic apparatus 210. In an example in which the electronic apparatus 210 cannot be implemented as the display apparatus, the electronic apparatus 210 may not include components for displaying an image, such as the display 213. For example, when the electronic apparatus 210 is implemented as a set-top box, the electronic apparatus 210 may output an image signal to an external TV through the signal input/output interface 212.

The communication interface 211 may include various communication circuitry including, for example, a two-way communication circuit that includes at least one of components such as communication modules and communication chips corresponding to various types of wired and wireless communication protocols. For example, the communication interface 211 may include a wireless communication module that performs wireless communication with an AP according to a Wi-Fi system, a wireless communication module that performs one-to-one direct wireless communication such as Bluetooth, an IR module for IR communication, a LAN card that is connected to a router or a gateway in a wired manner, and the like. The communication interface 211 may communicate with external devices such as the server 220 and the mobile device 240 on the network. The communication interface 211 may communicate with the remote controller 230 separated from a main body of the electronic apparatus 210 to receive a signal transmitted from the remote controller 230.

The signal input/output interface 212 may include various input/output circuitry and may, for example, be wired with an external device such as a set-top box or an optical media player in a 1:1 or 1:N (N is a natural number) manner to receive data from the external device or output data to the external device. The signal input/output interface 212 includes a connector, a port, or the like according to a predetermined transmission standard, such as an HDMI port, a DisplayPort, a DVI port, a thunderbolt, and a USB port.

The display 213 may include a display panel that may display an image on a screen. The display panel is provided as a light-receiving structure such as, for example, and without limitation, a liquid crystal type or a self-luminous structure such as an OLED type, or the like. The display 213 may further include additional components according to the structure of the display panel. For example, if the display panel is a liquid crystal type, the display 213 includes a liquid crystal display panel, a backlight unit that supplies light, and a panel driving substrate that drives a liquid crystal of the liquid crystal display panel.

The user input interface 214 may include various interface circuitry and may include various types of input interface related circuits that are provided to be manipulated by a user in order to perform user input. The user input interface 214 may be configured in various forms according to the type of the electronic apparatus 210, and the user input interface 214 includes, for example, a mechanical or electronic button unit of the electronic apparatus 210, a touch pad, a sensor, a camera, a touch screen installed on the display 213, and the like.

The storage 215 stores digitized data. The storage 215 may include a non-volatile storage that may preserve data regardless of whether or not the storage is supplied with power, and a volatile memory that may be loaded with data processed by the processor 217 and may not preserve data when the storage is not supplied with power. The storage may include a flash-memory, a hard-disc drive (HDD), a solid-state drive (SSD), a read only memory (ROM), and the like, and the memory includes a buffer, a random access memory (RAM), and the like. The storage 215 according to the present embodiment may store a plurality of applications for executing each of the plurality of voice assistants for processing a voice signal. The application stored in the storage 215 is driven by the processor 217 to execute the voice assistant.

The microphone 216 or the voice input interface collects sounds from the external environment including the user utterance. The microphone 216 transmits voice signals of the collected sounds to the processor 217.

The processor 217 may include various processing circuitry including, for example, one or more hardware processors implemented as, for example, and without limitation, a CPU, a chipset, a buffer, a circuit, and the like that are mounted on a printed circuit board, and may be implemented as a system on chip (SOC) depending on the design method. The processor 270 may include various modules corresponding to various processes such as a demultiplexer, a decoder, a scaler, an audio digital signal processor (DSP), and an amplifier when the electronic apparatus 210 is implemented as a display apparatus. Some or all of these modules may be implemented as SOC. For example, a module related to image processing such as a demultiplexer, a decoder, and a scaler may be implemented as an image processing SOC, and an audio DSP may be implemented as a separate chipset from the SOC.

When a voice signal of user utterance is received through a predetermined path, the processor 217 according to the present embodiment may execute the selected voice assistant according to a preset method to process the voice signal. While the plurality of voice assistants are operating in the background, the processor may select any one voice assistant according to the preset method, and cause the selected voice assistant to process the corresponding voice signal. An example method of selecting, by the processor 217, the voice assistant will be described in greater detail below.

The electronic apparatus 210 may obtain the voice of the user utterance in various ways.

For example, the electronic apparatus 210 may include the microphone 216 that collects sound. The voice signal of the user utterance collected through the microphone 216 is converted into a digital signal and transmitted to the processor 217.

When the remote controller 230 includes the microphone 236, the electronic apparatus 210 may transmit the voice signal of the user utterance, which is collected through the microphone 236, from the remote controller 230 through the communication interface 211. The remote controller 230 may convert the voice signal of the user utterance collected through the microphone 236 into a digital signal, and transmits the digital signal to the communication interface 211 through the remote control communication interface 231 according to a protocol that the communication interface 211 may receive.

In the case of a general-purpose device such as the mobile device 240, the mobile device 240 may operate similarly to the remote controller 230 by installing and executing an application provided for controlling the electronic apparatus 210. The mobile device 240 may convert the voice signal of the user utterance collected through the microphone 246 into a digital signal while the application is being executed, and transmits the digital signal to the communication interface 211 through the mobile communication interface 241.

Hereinafter, a method in which the processor 217 according to the embodiment of the disclosure selects any one of a plurality of voice assistants and causes the selected voice assistant to process user utterance will be described in greater detail.

Figure 3:
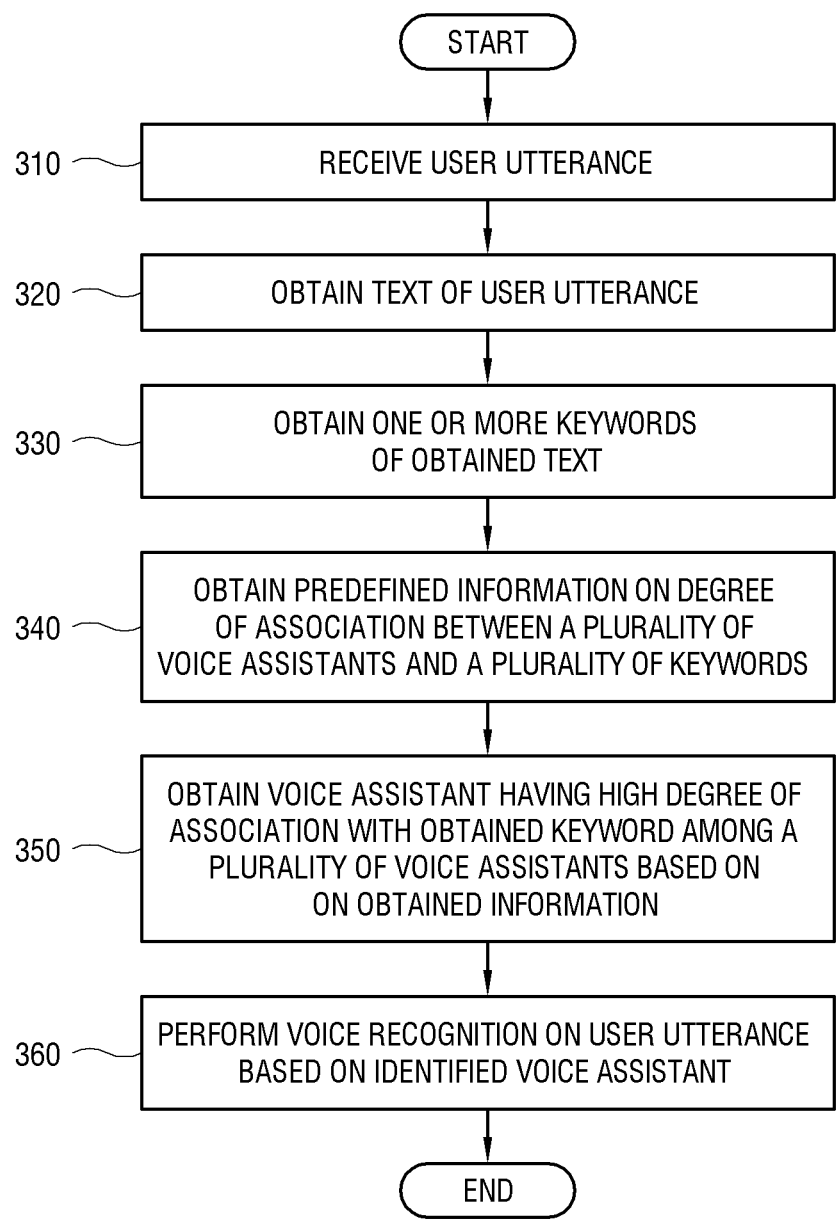
FIG. 3 is a flowchart illustrating an example method of controlling an electronic apparatus according to various embodiments.

FIG. 3 is a flowchart illustrating an example method of controlling an electronic apparatus according to various embodiments.

As illustrated in FIG. 3, the following operation may, for example, be performed by the processor of the electronic apparatus. In addition, the electronic apparatus may include a plurality of voice assistants.

In operation 310, the electronic apparatus receives the user utterance.

In operation 320, the electronic apparatus obtains the text of the received user utterance.

In operation 330, the electronic apparatus obtains one or more keywords of the text from the obtained text.

In operation 340, the electronic apparatus obtains predefined information on a degree of association between the plurality of voice assistants and the plurality of keywords. This information may include, for example, a table in which scores for each of the plurality of keywords are recorded for each voice assistant.

In operation 350, the electronic apparatus identifies a voice assistant having a high degree of association (e.g., a degree of association greater than a threshold value) with the keyword among the plurality of voice assistants, based on the obtained information. As an example of the identification method, the electronic apparatus may select the voice assistant having the highest score for the keyword included in the text of the user utterance from the table.

In operation 360, the electronic apparatus performs voice recognition on the user utterance based on the identified voice assistant.

As a result, the electronic apparatus may automatically identify the voice assistant suitable for processing the user utterance even if the user does not utter a trigger word or does not designate a specific voice assistant through a separate UI. The electronic apparatus may provide a customized service to the user by selecting an appropriate voice assistant to process the user utterance, irrespective of the user designating the voice assistant to process the user utterance.

The processor of the electronic apparatus may obtain the keyword of the user utterance as described above, identify the voice assistant having the high degree of association with the obtained keyword based on predefined information on the degree of association between the plurality of voice assistants and the plurality of keywords, and perform at least a part of data analysis, processing, and result information generation for an operation to perform the voice recognition on the user utterance based on the identified voice assistant using, for example, and without limitation, at least one of machine learning, a neural network, a deep learning algorithm such as rule-based and artificial intelligence algorithms, or the like.

For example, the processor of the electronic apparatus may perform the functions of a learning unit and a recognition unit together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain learning data to generate the neural network. For example, the learning unit may obtain the learning data from the storage of an electronic apparatus or from the outside. The learning data may be data used for learning the neural network, and the neural network may be trained using the data performing the above-described operation as the learning data.

Before learning the neural network using the learning data, the learning unit may perform a pre-processing operation on the obtained learning data, or select data to be used for learning from among a plurality of learning data. For example, the learning unit may process or filter the learning data in a predetermined format, or process data in a form suitable for learning by adding/removing noise. The learning unit may generate a neural network configured to perform the above-described operation using the pre-processed learning data.

The trained neural network may include a plurality of neural networks (or layers). The nodes of the plurality of neural networks may have weights, and the plurality of neural networks may be connected to each other so that an output value of one neural network is used as an input value of other neural networks. Examples of the neural networks may include models such as, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like.

In order to perform the above-described operation, the recognition unit may obtain target data. The target data may be obtained from the storage of the electronic apparatus or the outside. The target data may include data to be recognized by the neural network. Before applying the target data to the trained neural network, the recognition unit may perform the pre-processing operation on the obtained target data, or select data to be used for recognition from among the plurality of target data. For example, the recognition unit may process or filter the target data in a predetermined format, or process data in a form suitable for recognition by adding/removing noise. The recognition unit may obtain an output value output from the neural network by applying the pre-processed target data to the neural network. The recognition unit may obtain a probability value or a reliability value along with the output value.

Hereinafter, an example of the predefined information on the degree of association between the plurality of voice assistants and the plurality of keywords will be described in greater detail.

FIG. 4 is a diagram illustrating an example table provided to be referenced by the electronic apparatus according to various embodiments.

As illustrated in FIG. 4, the electronic apparatus may obtain a table 400 indicating the degree of association between the plurality of voice assistants and the plurality of keywords. Various keywords included in the table 400 may be selected according to various methods. For example, after words that are frequently used by users are collected, words of a predetermined rank or higher may be selected from among the words according to the frequency of use. If words are selected by a server, the server may obtain use histories of instructions from a plurality of clients, and select the frequently used words from various use histories obtained. Alternatively, words may be selected based on a noun excluding a postpositional particle, an adverb, and a pronoun among attributes of words.

The table 400 may include, for example, scores recorded for each of a plurality of predefined words for each of the plurality of voice assistants provided in the electronic apparatus. The items illustrated in this table 400 are only examples used for convenience and ease of description, and the corresponding items do not limit the form, method, and content of information on the degree of association between the plurality of voice assistants and the plurality of keywords.

For example, the case may be considered where there are words of "today", "weather", "recommendation", and "broadcasting", and two voice assistants such as a first assistant and a second assistant are provided in the electronic apparatus. Considering this case, the table 400 includes a score of the first assistant and a score of the second assistant for each word. For the word "today" in this table 400, the first assistant represents a score of 10, and the second assistant represents a score of 20.

The score of the table 400 may be calculated (determined) according to various methods. For example, this score may be prepared by reflecting the user history of the electronic apparatus. The user history may correspond, for example, to the count of the history of the number of times processed by the specific voice assistant when a user utters a specific word. The score may be provided as a numerical value equal to the accumulated number of times of processing words, or may be provided as a value obtained by multiplying the accumulated number of processing words by a preset weight. For example, if the accumulated number of times the first assistant processes the word "today" is 10 times, the score of the first assistant for "today" in the table 400 may be calculated as 10. If the predefined weight is 3 under the same condition, the score of the first assistant for "today" in the table 400 may be calculated as 30.

For example, the score recorded in the table 400 may indicate how many times the specific voice assistant processes a specific word. When the voice assistant is designed based on AI, the more the learning history, the more accurate the voice processed results may be fitted to the user's intention, so it is expected that a voice assistant having a high score will process the corresponding word more accurately. From this point of view, a voice assistant having a high score for a predetermined word is considered to be more suitable for processing the word.

The electronic apparatus may generate the table 400 from the beginning, update and use the table 400 provided by default at the manufacturing stage according to the use history, or update and use the table 400 provided from the server according to the use history. In any case, the electronic apparatus may implement the table 400 optimized for the user by updating the individual scores of the table 400 according to the use history.

Hereinafter, a method of identifying, by an electronic apparatus, a voice assistant more suitable for user utterance using the table 400 will be described in greater detail.

Figure 5:
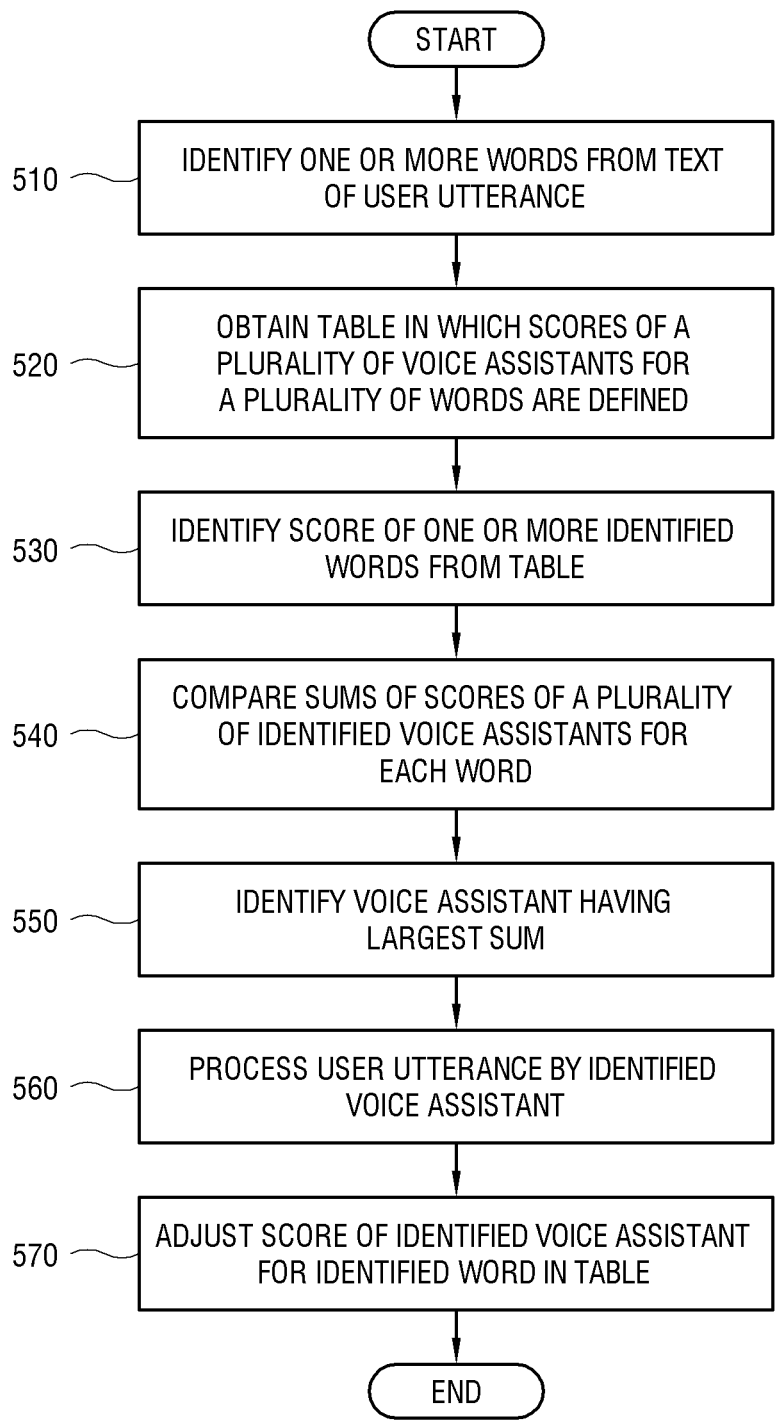
FIG. 5 is flowchart illustrating an example operation of identifying a voice assistant with reference to the table of FIG. 4 according to various embodiments.

FIG. 5 is flowchart illustrating an example operation of an electronic apparatus identifying a voice assistant with reference to the table of FIG. 4 according to various embodiments.

As illustrated in FIG. 5, the following operation may, for example, be performed by the processor of the electronic apparatus. Further, the electronic apparatus may include a plurality of voice assistants, and may obtain the table 400 (see FIG. 4) as illustrated in FIG. 4.

In operation 510, the electronic apparatus identifies one or more words from the text of the user utterance. For example, a case is considered where a user utters "how is the weather today". The electronic apparatus identifies one or more words from the text of the user utterance. Various criteria for identifying words are possible, and as an example, the electronic apparatus identifies words predefined in the table 400 (see FIG. 4) among words included in the text. In the case of this example, the electronic apparatus may identify two words: "today" and "weather".

In operation 520, the electronic apparatus obtains a table in which scores of a plurality of voice assistants for a plurality of words are defined. In this embodiment, reference is made to the table illustrated in FIG. 4 above.

In operation 530, the electronic apparatus identifies scores of one or more identified words from the table. The electronic apparatus checks the score of the first assistant and the score of the second assistant for each of the identified words "today" and "weather". The score of the first assistant for the word "today" is 10, and the score of the second assistant is 20. The score of the first assistant for the word "weather" is 30, and the score of the second assistant is 10.

In operation 540, the electronic apparatus compares the sum of scores of the plurality of voice assistants identified for each word with each other. For example, the sum of scores of the first assistant is 10+30=40, and the sum of scores of the second assistant is 20+10=30, so the sum of scores of the first assistant is greater than the sum of scores of the second assistant.

In operation 550, the electronic apparatus identifies the voice assistant having the largest sum. When the user utterance is "how is the weather today", the sum of scores of the first assistant is the largest.

In operation 560, the electronic apparatus processes user utterance by the identified voice assistant. For example, when the first assistant is identified, the electronic apparatus causes the first assistant to perform the voice recognition on the user utterance. If necessary, the first assistant may transmit the voice signal of the user utterance to the server to perform the voice recognition.

In operation 570, the electronic apparatus adjusts the score of the corresponding voice assistant for the word identified in the table according to the identification of the voice assistant. For example, the electronic apparatus may update the table by reflecting the history of the currently performed operation.

In the above example embodiment, an example in which the electronic apparatus identifies the score of the voice assistant for each word identified from the user utterance from the table, compares the sum of scores in units of each voice assistant, and finally selects the voice assistant having the highest sum will be described. However, the method of selecting, by the electronic apparatus, any one of the voice assistants based on the scores is not limited only to comparing the sum of the plurality of scores, and various modified methods may be applied.

For example, in the example embodiment, each score is simply summed without a difference in weight between the plurality of identified words. However, depending on the design method, a method of additionally adding weights to words that are considered to be more important by making a difference in weight between the identified words is possible.

For example, it is assumed that the words "today" and "weather" have been identified from the user utterance, and are preset to multiply the score for the word "today" by a value of 1.2 and multiply the score for the word "weather" by a value of 1.0. This corresponds to an example in which the word "today" is reflected by more increasing importance than that of the word "weather". In the case of the table of FIG. 4 as an example, the result value of the first assistant is 10*1.2+30*1.0=42, and the result value of the second assistant is 20*1.2+10*1.0=34. By comparing the result values of the plurality of voice assistants in this way, the voice assistant having the largest result value may be selected.

Operation 570 in the above-described example embodiment is a case of updating the table by reflecting the result of the currently performed operation in the table. Hereinafter, an example of such an operation will be described in greater detail.

Figure 6:
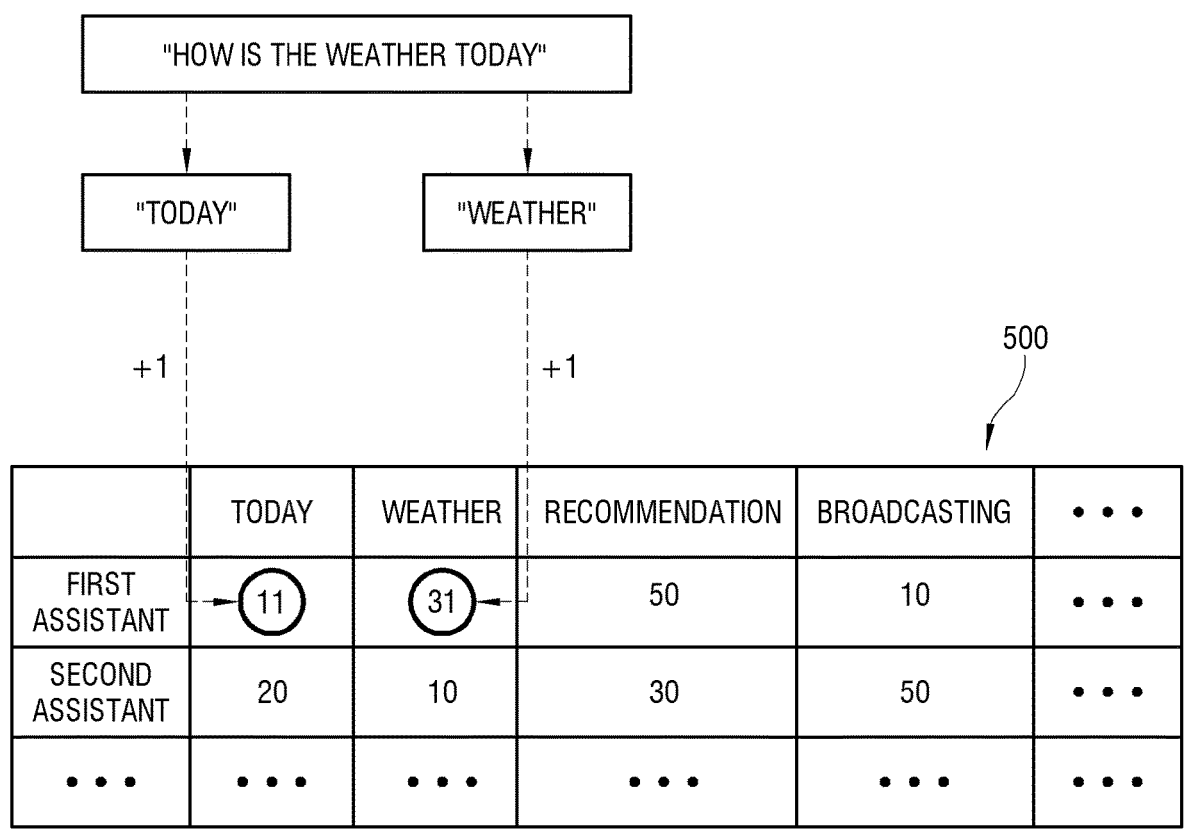
FIG. 6 is a diagram illustrating an example in which the electronic apparatus updates a result of updating the table of FIG. 4 by reflecting processed results of a user utterance according to various embodiments.

FIG. 6 is a diagram illustrating an example in which the electronic apparatus updates a result of updating the table of FIG. 4 by reflecting processed results of user utterance according to various embodiments.

As illustrated in FIG. 6, when the electronic apparatus identifies a voice assistant suitable for user utterance, a table 500 may be updated by reflecting the identified result. For example, a case is considered in which the user utterance is "how is the weather today", the words identified therefrom are "today" and "weather", and the first assistant is finally selected from among a plurality of voice assistants.

The electronic apparatus checks the score of the finally selected voice assistant for the word identified from the user utterance in the table 500. Since the identified words are "today" and "word" and the selected voice assistant is the first assistant, the electronic apparatus may check the score 10 for "today" and the score 30 for "weather" in the table 500.

The electronic apparatus adds a score corresponding to a preset value only to the score of the first assistant for the identified word "today" and "word". In this case, the score of the first assistant for "today" increases from 10 to 11, and the score of the first assistant for "weather" increases from 30 to 31. The present embodiment has been described that the increase value of the score is 1, but the specific value of the increase value is not limited. As the increase value of the score, different values may be applied corresponding to various conditions, depending on the design method. In addition, a method of adjusting a score value may not be limited only to the increase, and a method of subtracting a score may be possible depending on conditions. An example of the design method of the score will be described later.

Hereinafter, an embodiment of the method in which the electronic apparatus obtains an initial table will be described in greater detail.

Figure 7:
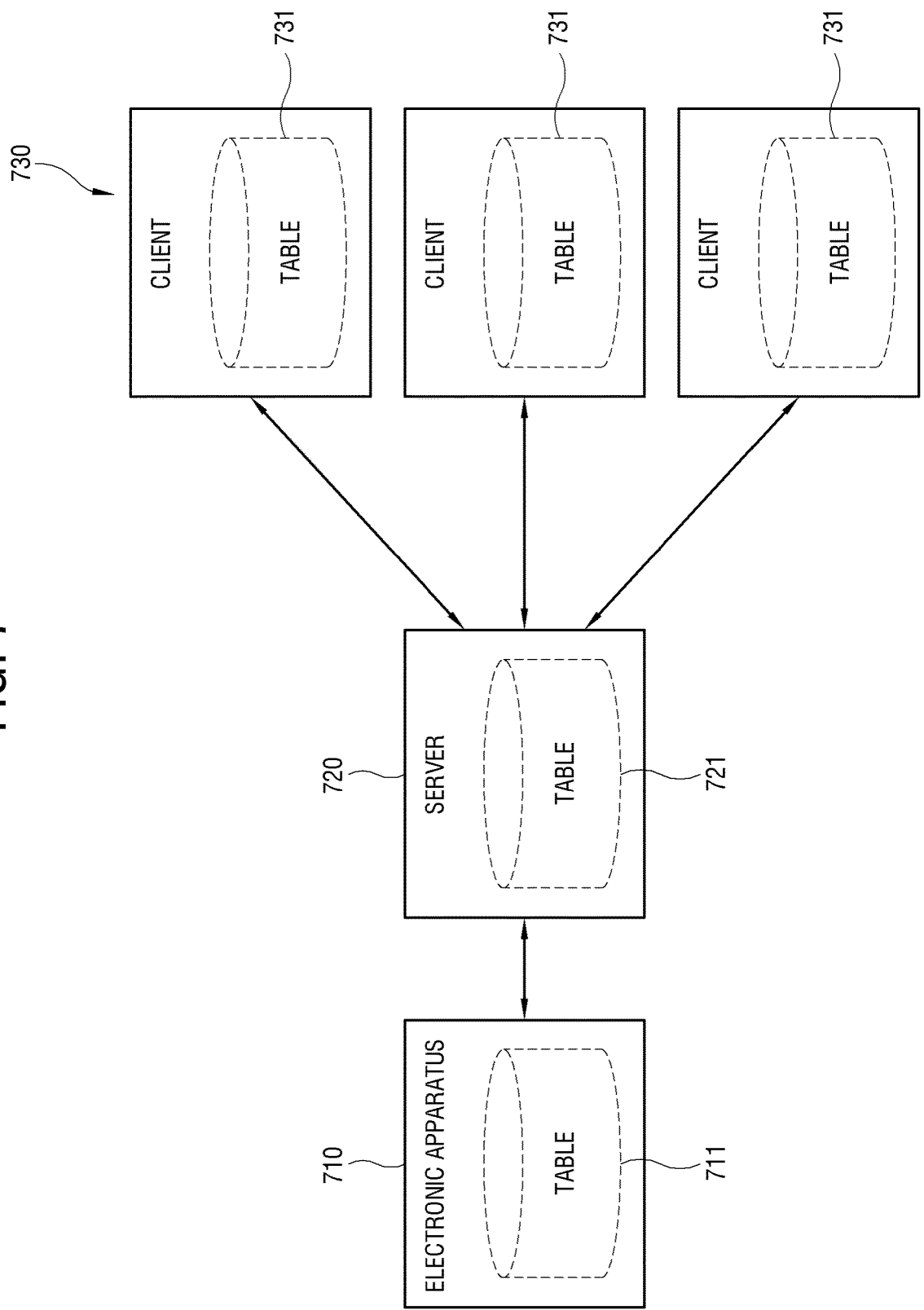
FIG. 7 is a diagram illustrating an example in which the electronic apparatus obtains an initial table according to various embodiments.

FIG. 7 is a block diagram illustrating an example configuration in which the electronic apparatus obtains an initial table according to various embodiments.

As illustrated in FIG. 7, an electronic apparatus 710 is connected to a network to enable communication with a server 720. The server 720 communicates with a plurality of clients 730. The electronic apparatus 710 may also be one of the plurality of clients 730, but only different terms are designated for mutual identification.

In constructing a table 711 as described in the above-described example embodiment, the electronic apparatus 710 may generate the table 711 by accumulating use history from the beginning. However, in this case, until a certain amount of data is secured so as to guarantee the reliability of the table 711, a time to accumulate the use history is required.

As another method, in the manufacturing stage of the electronic apparatus 710, a table 711 having an initial value may be stored in the storage of the electronic apparatus 710, and the electronic apparatus 710 may be released as a product.

As another method, the electronic apparatus 710 may receive the table 721 from the server 720 and may construct the table 711 by additionally reflecting the use history to the initial value of the received table 721 and updating the table 721. The server 720 may provide the stored table 721 only to the electronic apparatus 710 in one direction. The server 720 may receive feedback information on the update of the table 711 from the electronic apparatus 710 and update the previously stored table 721.

The server 720 may collect information on the tables 731 stored by each client 730 from a plurality of clients 730 that are communicatively connected in the same manner as the electronic apparatus 710. Each client 730 may individually store the table 731, and update the individually owned table 731 based on its own use history. The method of updating each table 731 is the same as or similar to that described in the above embodiment.

Each client 730 may provide the current information of the table 731 to the server 720 periodically or in response to a request from the server 720. The current information of the table 731 may include, for example, and without limitation, words defined in advance, identification names of a plurality of voice assistants, scores of voice assistants for each word, and the like.

The server 720 may create a new table 721 or update the table 721 based on the information on the table 731 obtained from each client 730. Various design methods may be applied to a method of generating or updating the table 721. For example, the server 720 may obtain scores of the same voice assistant for a specific word from the information collected from each client 730, and derive a value obtained by dividing the sum of the obtained scores by the numerical value of the client 730 as the score of the voice assistant of the corresponding word. This method is only an example, and the method of obtaining the value of the table 721 is not limited thereto.

In response to a request from the electronic apparatus 710 or in response to detecting that the electronic apparatus 710 is connected to the server 720, the server 720 may provide the table 721 constructed as described above to the electronic apparatus 710. The server 720 may obtain updated information of the table 711 from the electronic apparatus 710 and reflect the obtained updated information of the table 721 in the same manner as in the case of the client 730 described above.

When the electronic apparatus identifies the voice assistant based on the table, the amount of data in the table needs to be greater than a predetermined threshold in order to ensure reliability of the identification result. If the amount of data in the table is less than the threshold, the electronic apparatus may display the identification result as a UI. Hereinafter, an embodiment in which a UI is displayed will be described in greater detail.

Figure 8:
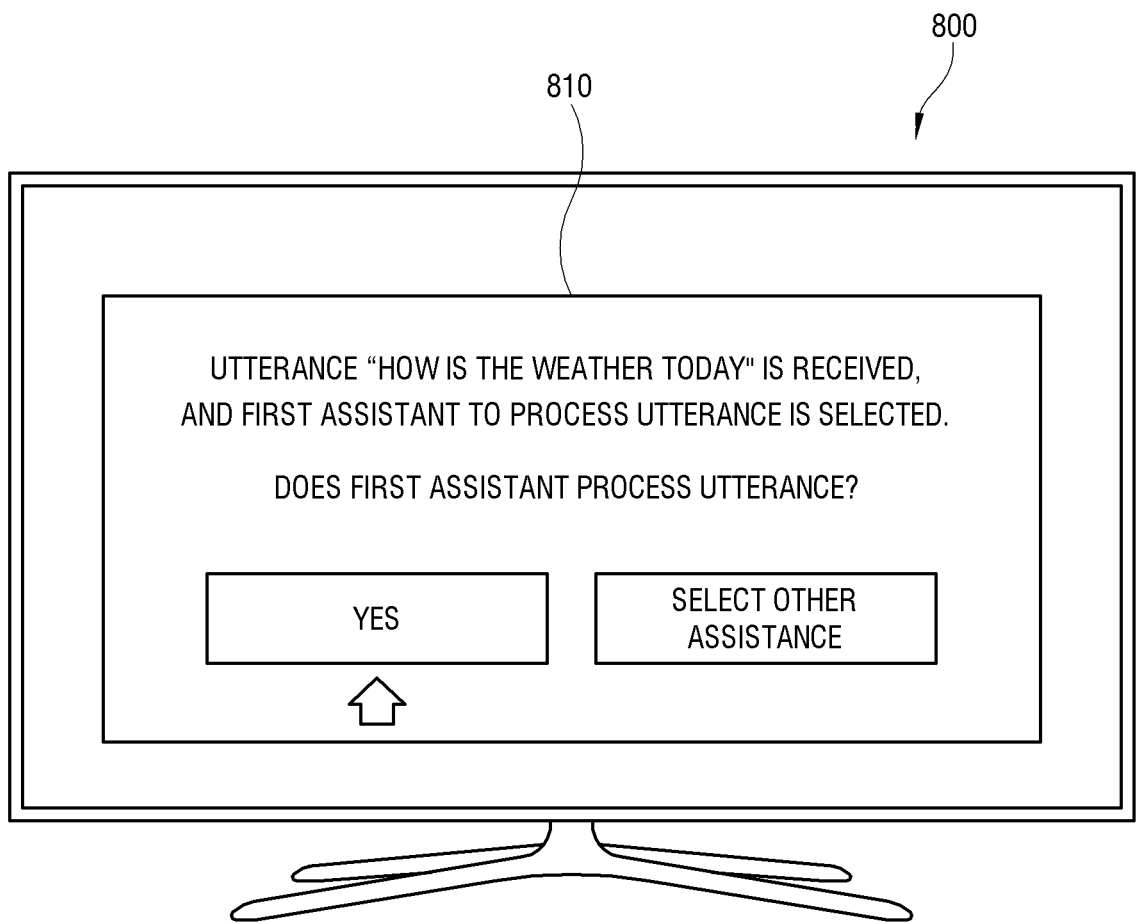
FIG. 8 is a diagram illustrating an example in which an electronic apparatus displays a UI of an identification result according to various embodiments.

FIG. 8 is a diagram illustrating an example in which the electronic apparatus displays the UI of the identification result according to various embodiments.

As illustrated in FIG. 8, an electronic apparatus 800 may identify the voice assistant suitable for the received user utterance, and display a UI 810 indicating the identification result. The UI 810 may include at least information indicating what the identified voice assistant is, and may additionally include received text of user utterance. For example, if user utterance of "how is the weather today" is received, and the first assistant among a plurality of voice assistants is selected for the received user utterance, the electronic apparatus 800 displays a UI 810 notifying the selected result.

The UI 810 may be displayed regardless of the situation depending on whether the electronic apparatus 800 is set, or may be selectively displayed. For example, when a voice assistant suitable for user utterance is identified based on a previously stored table, the electronic apparatus 800 identifies whether the amount of data in the table is greater than a threshold. When the amount of data in the table is greater than the threshold, the identification result using this table has sufficient reliability. On the other hand, when the amount of data in the table is not greater than the threshold, it may refer, for example, to the reliability of the identification result using this table not being great.

Accordingly, when the amount of data in the table is greater than the threshold, the electronic apparatus 800 does not display the UI 810 and causes the identified voice assistant to process the user utterance. On the other hand, when the amount of data in the table is not greater than the threshold, the electronic apparatus 800 displays the UI 810 to cause the user to select whether the identification result is positive. To this end, the UI 810 may guide the identification result, and provide an option to cause the user to select whether the identification result is positive (that is, whether the user may accept the identification result) or negative (that is, the user may not accept the identification result, and whether the user wants the processing by the voice assistant).

When a positive option for the identification result is selected in the UI 810, the electronic apparatus 800 causes the voice assistant identified as in the embodiment described above to process the user utterance to update the score of the table. On the other hand, when the negative option for the identification result is selected in the UI 810, the electronic apparatus 800 may progress to a new process for identifying other voice assistants, or may provide a separate UI provided to designate the voice assistant that the user wants.

The electronic apparatus may obtain a user's reaction (that is, a positive reaction or a negative reaction to the identification result, or when the user's satisfaction with the identification result is high or low) to the identification result of the voice assistant through various methods. For example, the electronic apparatus may identify whether the user is positive (that is, whether the user's satisfaction is high) or negative (that is, whether the user's satisfaction is low) for the identification result, based on the selection option provided through the UI 810 as in the present embodiment.

The electronic apparatus may identify that a processed result of first utterance is provided at a first time point by the voice assistant identified for first utterance of a user, and second utterance of the same content as the first utterance is received at a second time point within a preset time from the first time point. This may refer, for example, to the user not being satisfied with the processed result of the first utterance provided at the first time point. Accordingly, in the case of the identification as described above, the electronic apparatus may identify that the user negatively reacts to the processed result of the first utterance provided at the first time point.

On the other hand, after the electronic apparatus provides the processed result of the first utterance at the first time point, the second utterance of the same content as the first utterance may not be received within a preset time from the first time point. In this case, the electronic apparatus may identify that the user positively reacts to the processed result of the first utterance provided at the first time point.

After the electronic apparatus provides the processed result of the first utterance at the first time point, if an instruction such as cancellation or stop is input within a preset time from the first time point, the electronic apparatus may identify that the user negatively reacts to the processed result of the first utterance provided at the first time point.

The user's reaction identified in this way may be reflected in the table in a manner that makes the weights for the scores different in updating the score of the table. Hereinafter, an example embodiment in which the electronic apparatus adjusts the score of the table in response to user action will be described in greater detail.

Figure 9:
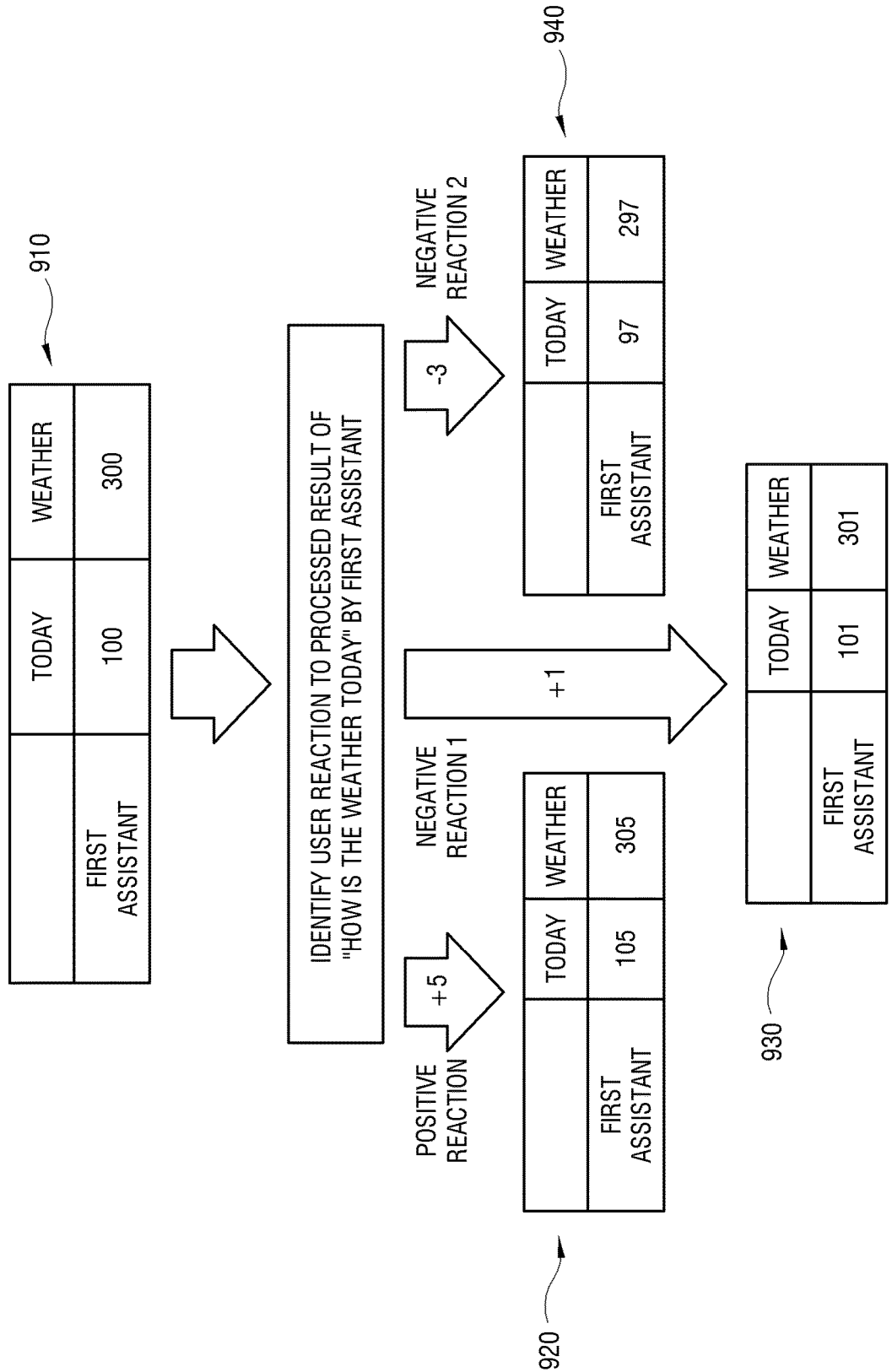
FIG. 9 is a diagram illustrating an example of an electronic apparatus adjusting a score of the table in response to a user reaction according to various embodiments.

FIG. 9 is a diagram illustrating an example of an electronic apparatus adjusting the score of the table in response to a user reaction according to various embodiments.

As illustrated in FIG. 9, when the user utterance is input, the electronic apparatus identifies predefined words from the user utterance, identifies the scores of each voice assistant for the corresponding words by referring to a table 910, and selects the voice assistant according to the identification result to process the user utterance, and adjusts the score of the table 910 according to the selected result. This process is as described in the above embodiment. For example, a case is considered in which the two words "today" and "weather" are identified for the user utterance of "how is the weather today", and as a result, the first assistant is selected from among the plurality of voice assistants based on the table 910.

The electronic apparatus identifies the user's reaction to the processed result of the user utterance of "how's the weather today" by the first assistant. The electronic apparatus may identify whether the user reaction is positive or negative according to various methods as described above.

If it is identified that the user reaction to the processed result by the first assistant of the user utterance is positive, the electronic apparatus adds a preset first weight to the score of the first assistant for the word identified from the user utterance in the table 910 to update a table 920. For example, it is assumed that the score for "today" of the first assistant is 100 and the score for "weather" in the table 910 is 300. If the first weight value when the user reaction is positive is +5, the score for "today" of the first assistant in the updated table 920 is 105 and the score for "weather" is 305.

On the other hand, if it is identified that the user reaction to the processed result by the first assistant of the user utterance is negative, the electronic apparatus may add a second weight less than the first weight to the corresponding score of the table 910 to update a table 930. For example, when the second weight is +1, the score for "today" of the first assistant in the updated table 930 is 101 and the score for "weather" is 301.

Alternatively, if it is identified that the user reaction to the processed result by the first assistant of the user utterance is negative, the electronic apparatus may add a third weight having a negative value to the corresponding score of the table 910 to update a table 940. For example, when the third weight is −3, the score for "today" of the first assistant in the updated table 940 is 97 and the score for "weather" is 297.

As described above, according to the user reaction to the processed result of the user utterance, the weights for the scores of the table 910 are applied differently, so the user's taste and preference may be more accurately reflected in the table 910.

On the other hand, in an example embodiment, the weights for the scores may be applied differently in response to the user reaction to the processed result, but the weights for the scores are not provided differently in response only to the user reaction. For example, the electronic apparatus may identify a user who utters, and may differently apply the weights of the scores according to the identified user. There are several possible methods of identifying a user. The electronic apparatus may identify a user based on the currently logged-in account, or may identify a user of a profile corresponding to the analysis result by analyzing the waveform of the voice signal of the user utterance.

As one of the methods of differently assigning weights to scores, the electronic apparatus may manage a synonym. Hereinafter, an embodiment in which an electronic apparatus adjusts a score through synonym management will be described in greater detail.

Figure 10:
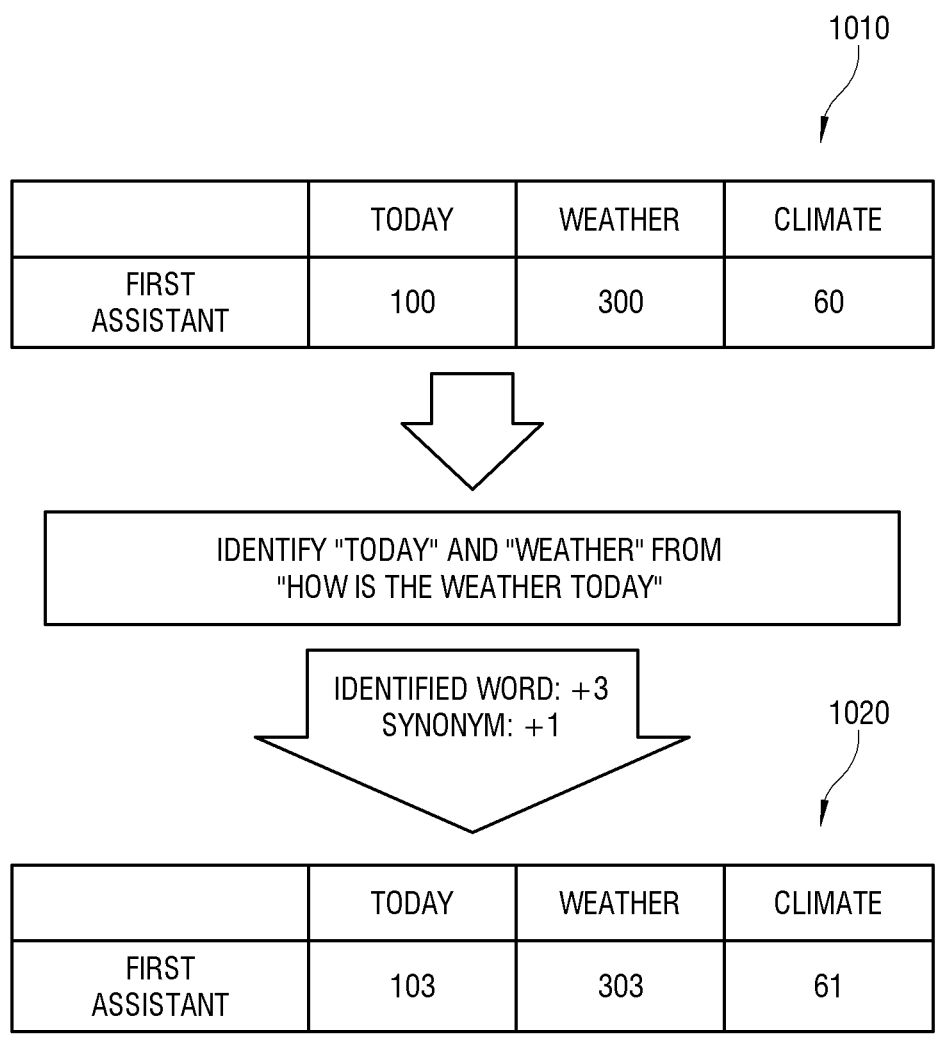
FIG. 10 is a diagram illustrating an example of an electronic apparatus adjusting a score of the table through synonym management according to various embodiments.

FIG. 10 is a diagram illustrating an example of an electronic apparatus adjusting a score of the table through synonym management according to various embodiments.

As illustrated in FIG. 10, for example, a case is considered in which the two words "today" and "weather" are identified for the user utterance of "how is the weather today", and as a result, the first assistant is selected from among the plurality of voice assistants based on a score of a table 1010. For example, if the first weight for the score of the identified word is set to +3, the electronic apparatus adjusts 100, which is the score for "today" of the first assistant in the table 1010, to 103, and adjusts 300, which is the score for "weather" of the first assistant, to 303.

The electronic apparatus may identify whether there is a synonym for the identified word among the words provided in the table 1010. For example, it is assumed that among the predefined words in the table 1010, there is "climate" which is synonymous with "weather".

The electronic apparatus may be provided to assign the second weight less than the first weight to the score for the identified word, for the synonym of the identified word. For example, if the second weight is set to +1 which is less than +3, the electronic apparatus adjusts 60, which is the score for the "climate" of the first assistant in the table 1010, to 61.

In this way, in the updated table 1020, the first weight is reflected in the score for the identified word, and the second weight less than the first weight is reflected in the score for the synonym of the identified word.

On the other hand, if it is identified that the amount of data in the table is less than the threshold or the use history is small enough to be insufficient to create a table, the electronic apparatus may provide the information on the processed results of the plurality of voice assistants to the user through the UI.

Figure 11:
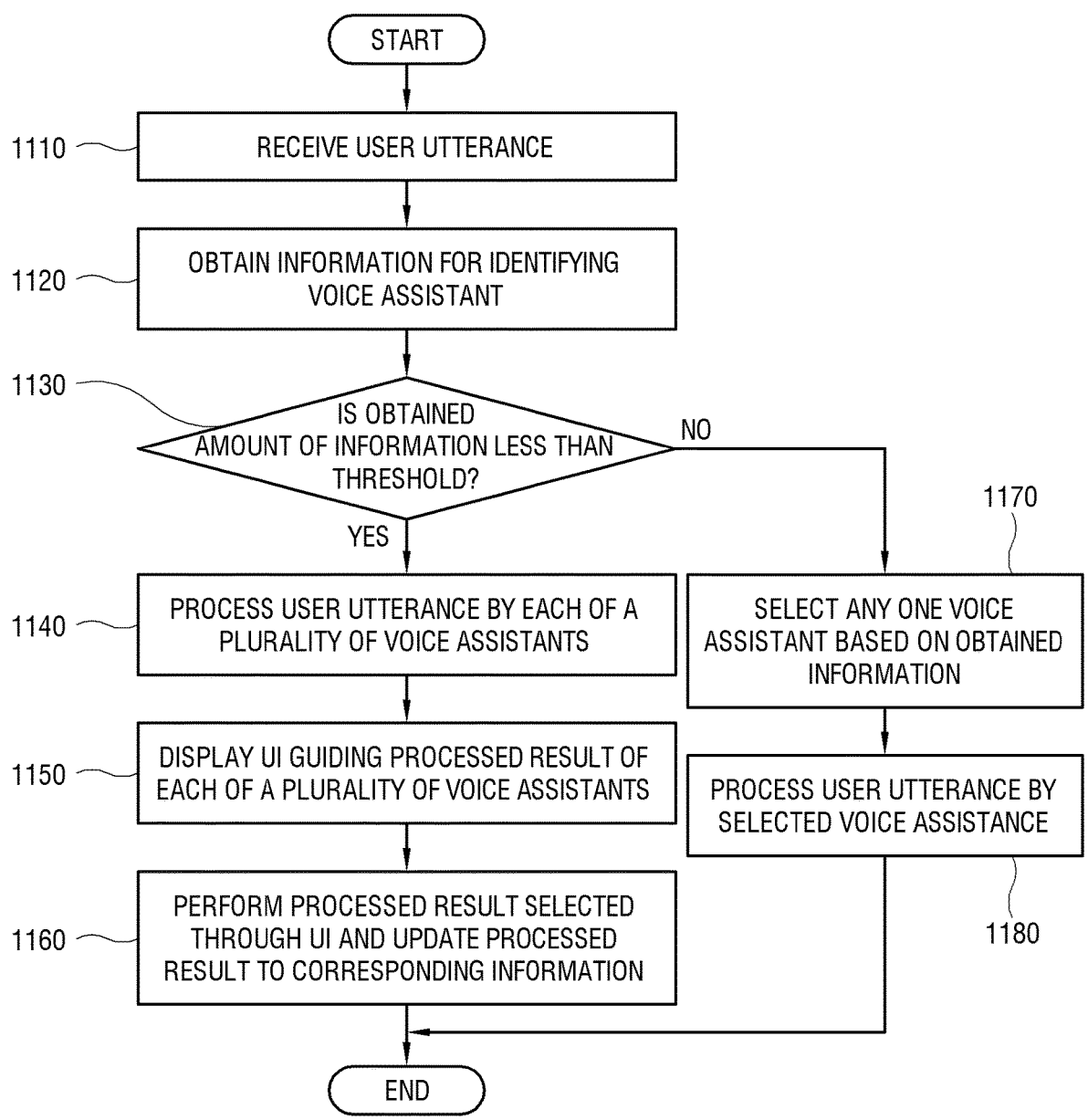
FIG. 11 is a flowchart illustrating an example method of controlling an electronic apparatus according to various embodiments.

FIG. 11 is a flowchart illustrating an example method of controlling an electronic apparatus according to various embodiments.

As illustrated in FIG. 11, the following operation may be performed by the processor of the electronic apparatus. The electronic apparatus may include a plurality of voice assistants for each processing user utterance.

In operation 1110, the electronic apparatus receives the user utterance.

In operation 1120, the electronic apparatus obtains the information for the identification of the voice assistant. This information may be predefined information on the degree of association between the plurality of voice assistants and the plurality of keywords, and may represent a table in the above-described embodiment. Alternatively, this information may be the accumulated use history to create a table.

In operation 1130, the electronic apparatus identifies whether the obtained amount of information is less than the threshold.

If it is identified that the obtained amount of information is less than the threshold ("Yes" in operation 1130), in operation 1140, the electronic apparatus causes each of the plurality of voice assistants to process the user utterance.

When the processed results are output from each of the plurality of voice assistants, in operation 1150, the electronic apparatus displays the UI for guiding the processed results of each of the plurality of voice assistants.

In operation 1160, the electronic apparatus executes the processed result selected through the UI, and updates the processed result by reflecting the processed result on the above information.

On the other hand, if it is identified that the obtained amount of information is not less than the threshold ("No" in operation 1130), in operation 1170, the electronic apparatus selects any one of the plurality of voice assistants based on the obtained information.

In operation 1180, the electronic apparatus processes the user utterance by the selected voice assistant.

As such, the electronic apparatus may perform a selective operation in response to the amount of information for identification of the voice assistant.

In the above-described example embodiment, an example has been described in which the electronic apparatus causes the optimal voice assistant selected based on the score of the table to provide the processed result of the user utterance. As a separate example, it is also possible to configure the electronic apparatus to provide a user with a ranking list of the plurality of voice assistants and causing a user to select the voice assistance.

Figure 12:
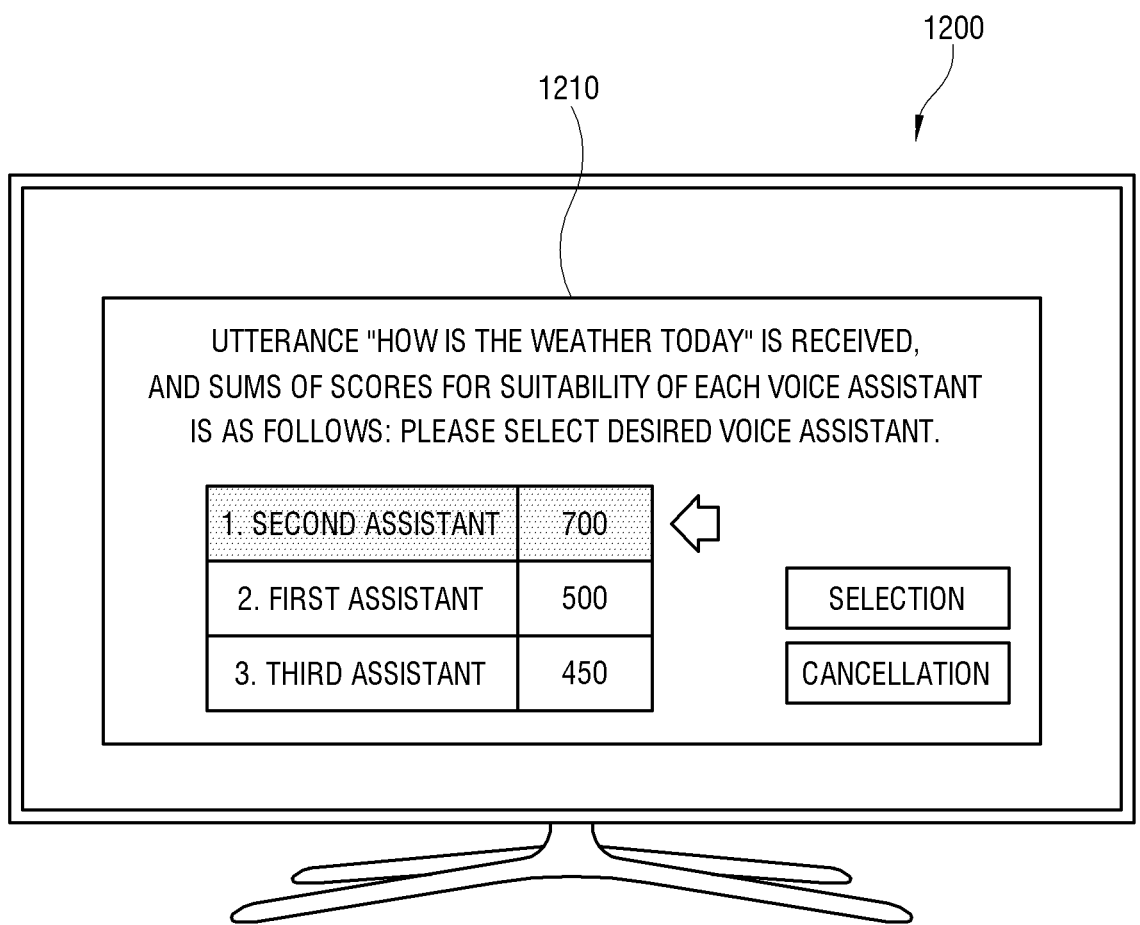
FIG. 12 is a diagram illustrating an example where the electronic apparatus displays a UI including information on processing suitability of a plurality of voice assistants according to various embodiments.

FIG. 12 is a diagram illustrating an example in which the electronic apparatus displays a UI including information on processing suitability of a plurality of voice assistants according to various embodiments.

As illustrated in FIG. 12, an electronic apparatus 1200 may display a UI 1210 including information indicating processing suitability of each of the plurality of voice assistants for the received user utterance.

When the user utterance is input, the electronic apparatus 1200 identifies a predefined word from the user utterance, calculates the sum of scores of each voice assistant for the corresponding word by referring to the table, selects the voice assistant of the sum of highest scores according to the calculated result to process the user utterance, and adjusts the scores of the table according to the selected result. This process is as described in the above embodiment.

In the above process, when the sum of scores of each of the plurality of voice assistants for the corresponding words is calculated by referring to the table, the electronic apparatus 1200 may display the UI 1210 without immediately selecting the voice assistant according to the design method. This UI 1210 shows the sum of scores of each of the plurality of voice assistants for the user utterance as a ranking. The user may compare how appropriate the plurality of voice assistants provided in the electronic apparatus 1200 are for the user utterance through the UI 1210 and may select any one of the voice assistants.

The electronic apparatus 1200 receives user utterance of "how is the weather today", and when the two words "today" and "weather" are identified, calculates the sum of scores of each of the plurality of voice assistants for these two words based on the table. The calculation method is as described in the above-described embodiment.

The electronic apparatus 1200 may display, on the UI 1210, items related to the plurality of voice assistants and the sum of scores of each voice assistant together. In this case, in the UI 1210, items of the plurality of voice assistants may be arranged and displayed in the order in which the sum of scores is large. According to the example of the drawing, since the sum of scores of the second assistant is the largest as 700, the second assistant is displayed at the highest position in the UI 1210.

The UI 1210 may be displayed by the setting of the electronic apparatus 1200, or may be selectively displayed when it is identified that the reliability of the table is not high.

In the above embodiment with reference to FIG. 10, as one of the methods of differently assigning weights to scores, the case has been described in which the electronic apparatus manages a synonym. However, it may not be limited that only the synonym of the predefined word prepared for identification is related to the corresponding word, and word categories related to the corresponding word may be managed according to various criteria.

Figure 13:
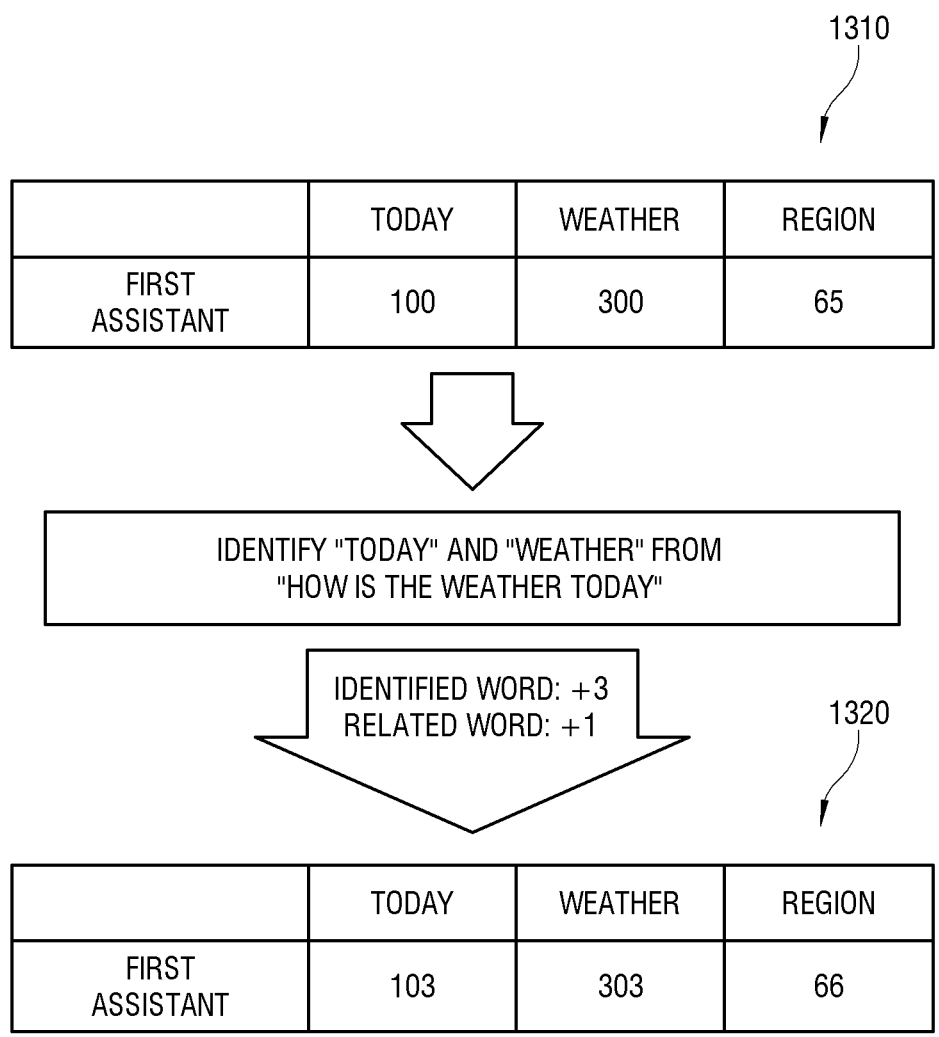
FIG. 13 is a diagram illustrating an example of the electronic apparatus adjusting a score of the table through management of a related word category according to various embodiments.

FIG. 13 is a diagram illustrating an example of the electronic apparatus adjusting a score of the table through management of a related word category according to various embodiments.

As illustrated in FIG. 13, for example, a case is considered in which the two words "today" and "weather" are identified for the user utterance of "how is the weather today", and as a result, the first assistant is selected from among the plurality of voice assistants based on a score of a table 1310. For example, if the first weight for the score of the identified word is set to +3, the electronic apparatus adjusts 100, which is the score for "today" of the first assistant to 103 in the table 1310, to 103, and adjusts 300, which is the score for "weather" of the first assistant, to 303.

The electronic apparatus identifies whether there is a word category designated as having a relationship with the identified word among words provided in the table 1310. This word category, is a group of predefined words, may be synonymous with a reference word (that is, a predefined word to be identified) (refer to the embodiment related to FIG. 10) or a word considered to be related even if the meaning is not the same, or may include search words having various relevance on the current trend in SNS and the like. That is, words of the category related to the reference word may be selected by various methods and criteria, and, for example, a category of words related to the reference word may be designated using an AI model.

For example, it is assumed that among the predefined words in the table 1310, there is a "region" as a word related to "weather".

The electronic apparatus may be provided to assign the second weight less than the first weight to the score for the identified word, for the word of the category related to the identified word. For example, if the second weight is set to +1 which is less than +3, the electronic apparatus adjusts 65, which is the score for the "region" of the first assistant in the table 1310, to 66.

In this way, in the updated table 1320, the first weight is reflected in the score for the identified word, and the second weight less than the first weight is reflected in the scores for other words related to the identified word.

The electronic apparatus may store a predefined DB or list related to word categories that are synonymous with or related to the reference word, and may identify other words related to the identified reference word from the stored DB or list. Since such a DB is provided to the electronic apparatus by the server, it is possible for the electronic apparatus to use a DB in which words are periodically updated. When the server provides the updated DB to several electronic apparatuses, the server may update the DB based on the collected DB usage history from each electronic apparatus.

The operations of the apparatus as described in the above embodiments may be performed by artificial intelligence mounted in the apparatus. The artificial intelligence may be applied to various systems using machine learning algorithms. The artificial intelligence system may include a computer system that implements intelligence corresponding to a human level or comparable to a human level, and may include a system in which a machine, an apparatus, or a system autonomously performs learning and determination, and the recognition rate and determination accuracy are improved based on accumulation of use experience. The artificial intelligence technology may include machine learning technologies that use algorithms to classify/learn characteristics of input data, element technologies that simulate functions of recognition, determination, and the like of a human brain using machine learning algorithms, and the like.

Examples of the element technologies may include, for example, and without limitation, at least one of linguistic understanding technology for recognizing human language/character, visual understanding technology for recognizing objects like human vision, reasoning/prediction technology for logically reasoning and predicting information by determining the information, knowledge expression technology for processing human experience information with knowledge data, or motion control technology for controlling autonomous driving of vehicles and movement of robots.

The linguistic understanding may refer, for example, to a technology of recognizing and applying/processing human languages/characters, and includes natural language processing, machine translation, a dialog system, question and answer, speech recognition/synthesis, and the like.

The inference/prediction may refer, for example, to a technology of deciding and logically predicting information, and includes knowledge/probability-based inference, optimization prediction, preference-based planning, recommendation, and the like.

The knowledge representation may refer, for example, to a technology of automating and processing human experience information as knowledge data, and includes knowledge establishment (data generation/classification), knowledge management (data utilization), and the like.

Methods according to embodiments of the disclosure may be implemented in a form of program commands that may be executed through various computer means and may be recorded in a computer-readable recording medium. The computer-readable recording medium may include a program command, a data file, a data structure, or the like, alone or a combination thereof. For example, the computer-readable recording medium may be stored in a non-volatile storage such as a USB memory device, a memory such as a random access memory (RAM), a read only memory (ROM), a flash memory, a memory chip, or an integrated circuit, or a storage medium optically or magnetically readable by a machine (for example, a computer), such as a compact disk (CD), a digital versatile disk (DVD), a magnetic disk, a magnetic tape, or the like, regardless of whether data are erasable or rewritable. A memory that may be included in a mobile terminal is an example of a storage medium appropriate for storing a program or programs including instructions implementing embodiments of the disclosure and readable by a machine. The program instructions recorded in this storage medium may be specially designed and constructed for the disclosure or may be known and usable by those skilled in the art of computer software. The computer program instruction may also be implemented by the computer program product.

While the disclosure has been illustrated and described with reference to various example embodiments, it will be understood that the various embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic apparatus, comprising:
   a voice input interface comprising circuitry configured to receive a voice input; and
   a processor configured to:
      obtain predefined information including scores for a plurality of voice assistants with respect to each of a plurality of keywords,
      based on a voice input being received through the voice input interface, obtain keywords of the voice input,
      obtain association degrees for the plurality of voice assistants, wherein each of the association degrees is based on combining scores between the obtained keywords and respective voice assistant of the plurality of voice assistants in the predefined information,
      select a voice assistant among the plurality of voice assistants based on the obtained association degrees, and
      perform a function corresponding to the voice input based on the selected voice assistant.

2. The electronic apparatus of claim 1, wherein the processor is configured to select the voice assistant among the plurality of voice assistants having a highest degree of association from among the obtained association degrees for the plurality of voice assistants.

3. The electronic apparatus of claim 1, wherein the plurality of voice assistants are included in the electronic apparatus.

4. The electronic apparatus of claim 1, wherein the predefined information is based on a use history of the electronic apparatus.

5. The electronic apparatus of claim 4, wherein the use history includes information obtained by counting a processing history of each of the plurality of voice assistants for a predetermined keyword of user voice input.

6. The electronic apparatus of claim 1, wherein the processor is configured to adjust the association degree of the selected voice assistant for the plurality of keywords based on selecting the voice assistant associated with the obtained plurality of keywords.

7. The electronic apparatus of claim 6, wherein the processor is configured to:
   identify satisfaction with a result of performed voice recognition, and
   to increase or decrease the association degree of the selected voice assistant with the obtained plurality of keywords based on the identified satisfaction.

8. The electronic apparatus of claim 7, wherein the processor is configured to add a first adjustment value to the association degree of the selected voice assistant based on an identification that the satisfaction is high, and to add a second adjustment value less than the first adjustment value to the association degree of the selected voice assistant based on an identification that the satisfaction is low to adjust the association degree of the selected voice assistant.

9. The electronic apparatus of claim 1, wherein the predefined information includes information obtained based on a plurality of other voice inputs.

10. The electronic apparatus of claim 1, wherein the processor is configured to control a display to display a UI guiding the selected voice assistant based on an identification that an amount of data of the predefined information is not greater than a threshold, and to perform voice recognition on a voice input in response to a selection through the UI of the selected voice assistant.

11. The electronic apparatus of claim 1, wherein the processor is configured to control a display to display a UI guiding a result of voice recognition by each of the plurality of voice assistants based on an identification that an amount of data of the predefined information is not greater than a threshold, and to perform the result on any one of the voice assistants selected through the UI.

12. A method of controlling an electronic apparatus, the method comprising:
   obtaining predefined information including scores for a plurality of voice assistants with a plurality of keywords;

based on a voice input received through a voice input interface comprising circuitry configured to receive the voice input, obtaining keywords of the voice input;

obtaining association degrees for the plurality of voice assistants, wherein each of the association degrees is based on combining scores between the obtained keywords and respective voice assistant of the plurality of voice assistants in the predefined information;

selecting a voice assistant among the plurality of voice assistants based on the obtained association degrees; and performing a function corresponding to the voice input based on the selected voice assistant.

13. The method of claim 12, wherein the voice assistant having a highest degree of association from among the obtained association degrees for the plurality of voice assistants is selected among the plurality of voice assistants.

14. The method of claim 12, wherein the plurality of voice assistants are included in the electronic apparatus.

15. The method of claim 12, wherein the predefined information is provided based on a use history of the electronic apparatus.

16. The method of claim 15, wherein the use history includes information obtained by counting a processing history of each of the plurality of voice assistants for a predetermined keyword.

17. The method of claim 12, further comprising:

adjusting the association degree of the selected voice assistant for the plurality of keywords based on selecting the voice assistant associated with the obtained plurality of keywords.

18. The method of claim 17, wherein satisfaction with a result of performed voice recognition is identified, and the association degree of the selected voice assistant with the obtained plurality of keywords increases and decreases based on the identified satisfaction.

19. The method of claim 18, wherein a first adjustment value is added to the association degree of the selected voice assistant based on an identification that the satisfaction is high, and a second adjustment value less than the first adjustment value is added to the association degree of the selected voice assistant based on an identification that the satisfaction is low to adjust the association degree of the selected voice assistant.

20. The method of claim 12, wherein the predefined information includes information obtained based on a plurality of other voice inputs.

* * * * *